United States Patent
Nicolaus

[11] 3,802,832
[45] Apr. 9, 1974

[54] FOOD PROCESSING APPARATUS FOR THE HEAT-TREATMENT OF FOOD

[75] Inventor: Norbert Nicolaus, Elze, Germany

[73] Assignee: Vosswerke GmbH, Sarstedt, Germany

[22] Filed: Nov. 16, 1971

[21] Appl. No.: 199,129

[30] Foreign Application Priority Data
Jan. 8, 1971 Germany............................ 2100818

[52] U.S. Cl............................... 432/128, 99/443 C
[51] Int. Cl............................................. F27b 13/02
[58] Field of Search......... 107/55 R, 55 A, 56, 57 R, 107/57 A, 57 B, 57 C, 62, 65; 263/36; 126/273; 99/339, 386, 443 C; 432/128, 163; 34/180, 212, 216, 217

[56] References Cited
UNITED STATES PATENTS

| | | | |
|---|---|---|---|
| 1,517,271 | 12/1924 | Woodson............................ | 107/57 R |
| 1,949,684 | 3/1934 | Houlis................................ | 107/57 R |
| 3,351,025 | 11/1967 | Tillander et al.................... | 107/55 R |
| 3,440,975 | 4/1969 | Beuker............................ | 107/55 R X |
| 3,561,373 | 2/1971 | Sievert............................... | 107/57 D |
| 863,830 | 8/1907 | Ashley et al....................... | 34/216 X |
| 3,678,244 | 7/1972 | Worline .............................. | 99/443 C |
| 3,444,627 | 5/1969 | Heikinheimo..................... | 34/216 X |
| 1,151,356 | 8/1915 | Gottschalk..................... | 99/443 C X |
| 1,405,781 | 2/1922 | Harris................................. | 34/217 |

Primary Examiner—Geo. V. Larkin
Attorney, Agent, or Firm—Mason, Mason & Albright

[57] ABSTRACT

Food processing apparatus comprises a heating chamber formed from a number of sub-chambers which are releasably interconnected so that the capacity of the apparatus can be varied. Each sub-chamber includes an air heating and circulating arrangement.

5 Claims, 7 Drawing Figures

PATENTED APR 9 1974

INVENTOR
NORBERT NICOLAUS.

BY
Mason, Mason & Albright
ATTORNEYS

PATENTED APR 9 1974 3,802,832

INVENTOR
NORBERT NICOLAUS
BY
Mason, Mason & Albright
ATTORNEYS

FOOD PROCESSING APPARATUS FOR THE HEAT-TREATMENT OF FOOD

BACKGROUND OF THE INVENTION

1. Field of the Invention

The present invention relates to food processing apparatus for the heat-treatment of food.

2. Description of the Prior Art

In practice, food processing apparatus, when installed may prove to be inadequate in performance because, for example, the number of items requiring heat-treatment exceeds the number for which the apparatus was originally intended. With previously proposed heat-treatment apparatus, such expansion in production necessitates the installation of an entire new apparatus having a higher output which will involve considerable capital outlay.

An object of the invention is to provide heat-treatment apparatus which can be readily adapted to suit the output requirements from time to time.

SUMMARY OF THE INVENTION

According to the present invention there is provided in food processing apparatus, a device for the heat-treatment of food, said device comprising means defining a heating chamber, said means comprising means defining a number of releasably interconnected sub-chambers each including heating means, and air-circulating means, and conveying means for feeding food to be processed through said heating chamber.

Preferably conveyance of food-carrying means is automatic throughout the apparatus and is set to provide the requisite different processing times. The automatic feed can either be controlled from a manual keyboard or programed electronically. Both the input and the output ends of the heating chamber are closed by a door, which can be moved either upwardly, downwardly or sideways, and which is opened and closed automatically in conjunction with the program control of the approach, processing and removal timings. The doors can be operated pneumatically or hydraulically. The temperatures and the air-flow speeds in the individual sub-chambers can be varied according to the nature of the treatment to be effected, and temperature control in the individual sub-chambers can be provided by contact thermometers or thermostats.

BRIEF DESCRIPTION OF THE DRAWINGS

An embodiment of the invention will now be described, by way of example only, with reference to the accompanying purely diagrammatic drawings, in which.

DESCRIPTION OF THE PREFERRED EMBODIMENT

Figure 1:
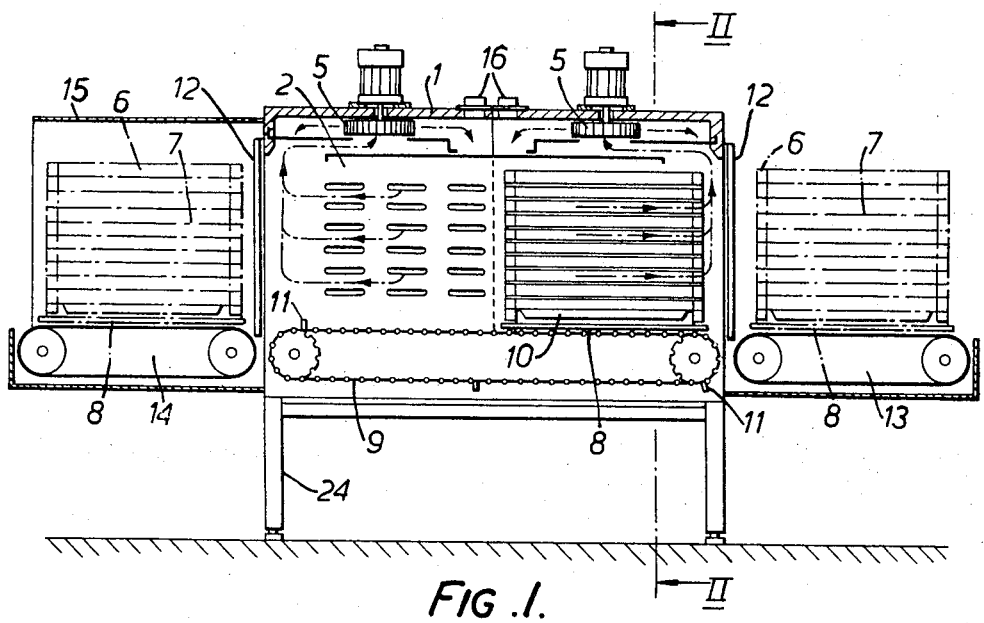
FIG. 1 is a vertical section of a heat-treatment device of apparatus in accordance with the invention.
Figure 3:
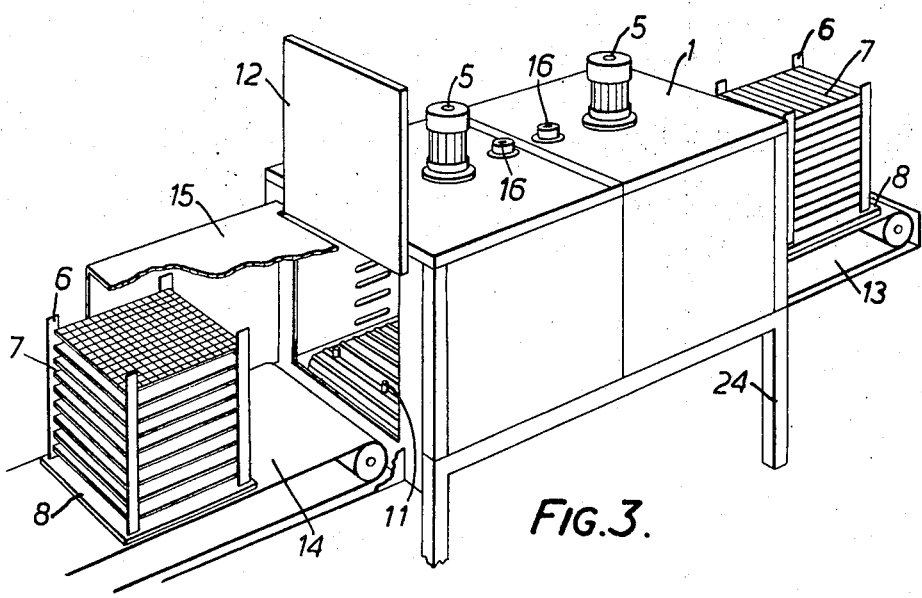
FIG. 3 is an perspective view of the device shown in FIG. 1.

As shown in the drawings, food processing apparatus comprises a heat-treatment device 1 including an insulated heating chamber 2 in the form of a tunnel oven in which food is cooked, roasted, or thawed by heated air. The air is heated by heaters 3 or 4 which are preferably electric heaters and is circulated by fans 5 along paths indicated by the arrows in FIGS. 1, 2 and 4. The air flow paths ensure an adequate, even, temperature for the particular heat-treatment to be given. The fans 5 are preferably mounted in the upper wall of the chamber 2, but can alternatively be positioned in a side wall or elsewhere in the chamber 2.

Figure 5:
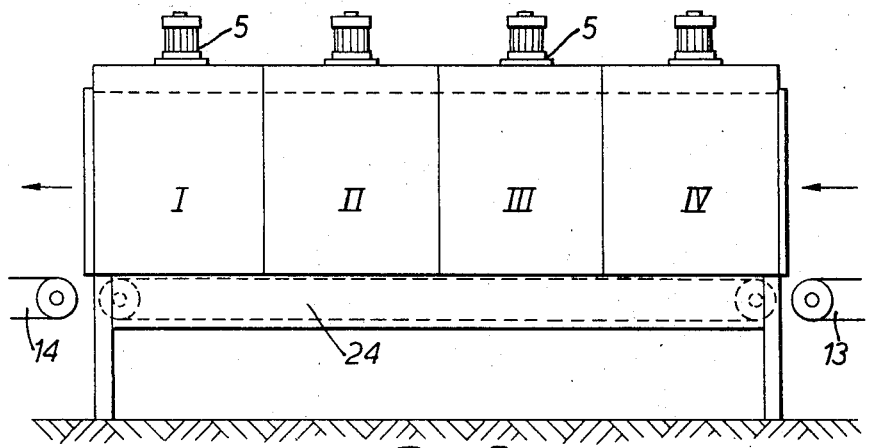
FIG. 5 is a side elevation of the device shown in FIG. 1.
Figure 6:
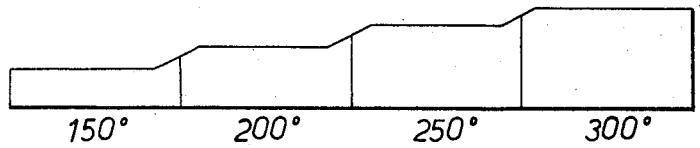
FIG. 6 is a graphical representation of the temperature distribution in the various sub-chambers of the device.

As clearly shown in FIG. 5, the chamber 2 is made up of several sub-chambers, I – IV, which can be releasably connected. Each sub-chamber I-IV has a respective fan 5, a respective heater 3 or 4, and air-flow guiding means in the form of ducts. By suitably joining the sub-chambers I-IV together, it is a simple matter to vary the capacity of the device as required, and a device already in existence can be readily extended and its output increased by the addition of one or more sub-chambers. An exemplary temperature distribution in the four sub-chambers forming the chamber 2 illustrated is shown in FIG. 6. The running speed of the fans 5 and the heat output of the heaters 3 and 4 can be regulated by conventional means so that any desired baking, cooking or other heat-treatment program can be smoothly effected. Preferably, the speed of each fan 5, and the output of each heater 3 or 4 can be regulated independently.

Frames 6, which mount grids or sheets 7 that carry the food, are supported on pallets 8 and are automatically carried through the chamber 2 by a single endless belt conveyor 9, which can be of any type. The frames 6 can be fed continuously or intermittently either singly or in groups of two or more frames 6.

A drip-tray 10, for fat, is located at the bottom of the frame 6, below the grids or sheets 7, and the conveyor 9 carries straight or hooked flights 11, which engage the frame 6 as it enters the chamber 2 and convey it through the chamber according to the speed to which the conveyor 9 is set or to the duration of treatment.

The chamber 2 formed by the sub-chamber is closed at each end by sliding or folding doors 12, which can be opened and closed either upwardly, downwardly or sideways.

An endless feed conveyor 13 is located in front of the intake end of the chamber 2 and a discharge conveyor of any desired type is located beyond the discharge end of the chamber 2. A tunnel 15 is fitted over the discharge conveyor 14 to prevent premature cooling of the food.

Vapors or cooking aromas can be extracted from the chamber 2 through draw-off connections 16 in the upper wall thereof.

Figure 7:
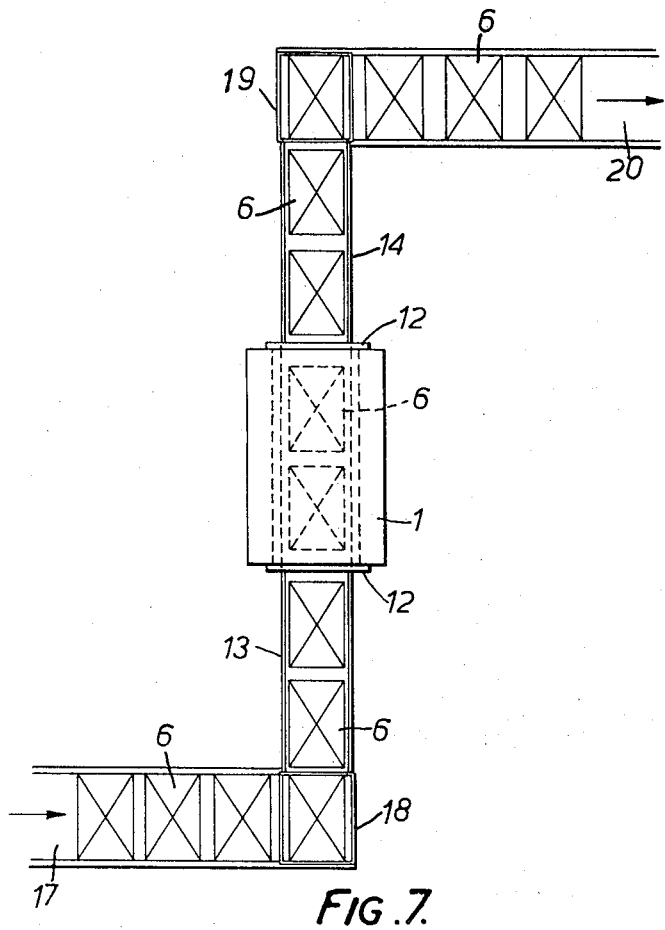
FIG. 7 is a plan, to a reduced scale, of the apparatus.

In operation, the frames 6 supported on pallets 8 and carrying the food to be treated are fed by a roller or belt conveyor 17 (FIG. 7) from a preparation room to a transfer position 18, where they are transferred to the conveyor 13 (FIG. 7) and fed to the intake end of the chamber 2.

Operation of the apparatus is controlled from a keyboard or is effected electronically from a program and when a frame 6 reaches the intake end of the chamber 2, the door 12 at the intake end opens automatically and the frame 6 is transferred to the conveyor 9 within the chamber 2 and is carried through the chamber 2, the door 12 being reclosed automatically. After processing, the door 12 at the discharge end of the chamber 2 is opened and the frame 6 is transferred to the discharge conveyor 14, whereupon the door 12 re-closes automatically. The conveyor 14 feeds the frame 6 to a transfer position 19, whence it is carried by a conveyor 20 to a distribution position.

The time taken by a frame 6 to pass through the chamber 2 is determined by the nature of the treatment being given, which thus governs the speed of the conveyor 9. The conveyor 9 is continuously driven whilst a frame 6 is within the chamber 2, even when there are no following frames 6 on the conveyor 13, for example owing to a fault. The conveyor 9 cannot be stopped until the chamber 2 is empty.

As will be apparent, the chamber 2 can be formed from any number of sub-chambers, the sub-chambers being supported on a base-frame 24 and being secured together by bolts, for example.

Figure 2:
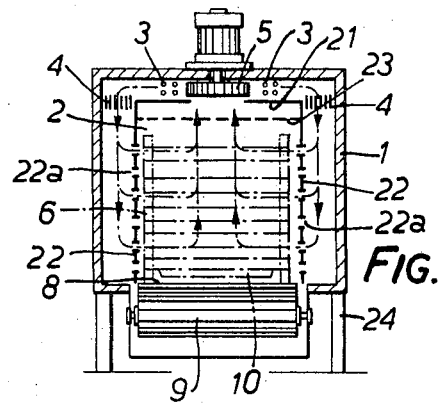
FIG. 2 is a section taken on line II—II of FIG. 1.
Figure 4:
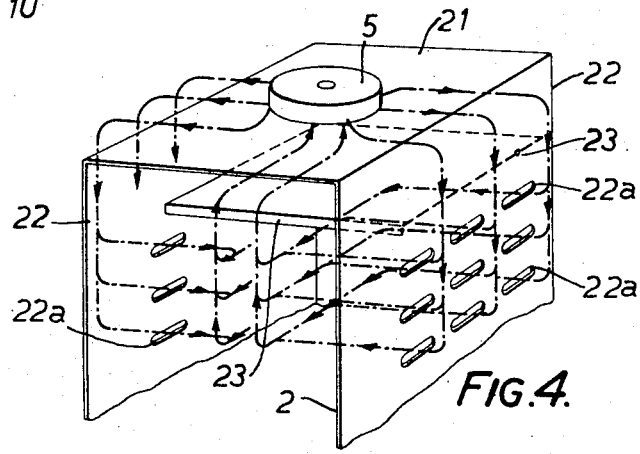
FIG. 4 is a fragmentary perspective view of a sub-chamber of the device shown in FIG. 1.

The air flow path in each sub-chamber is shown in FIGS. 2 and 4 and is bounded by an inner upper wall 21, and two inner side walls or baffles 22 of the sub-chamber. The side walls contain openings 22a through which heated air enters the sub-chamber. A partition 23 is mounted beneath the upper wall 21 to direct air towards the fan 5.

The apparatus particularly described is of such a size as to readily accommodate two frames 6 in the chamber 2 at any one time, but can be adapted so as to accommodate more, or less frames 6 at one time in the chamber 2. The individual sub-chambers are relatively inexpensive to produce and can be readily assembled to form the chamber 2.

What is claimed is:

1. In food processing apparatus,
a device for the heat-treatment of food, said device comprising
means defining a heating chamber having an inlet end and a discharge end, said means comprising
means defining a number of separable aligned sub-chambers each including
heating means, and
fan means circulating heated air within the sub-chamber such that the air circulates within the sub-chamber along a closed path past the heating means and past food located in the sub-chamber, and
conveying means for feeding food to be processed through said heating chamber, said conveying means comprising
an endless conveyor extending through said heating chamber, said endless conveyor including
an intake end,
a discharge end, and
flights for engaging food-carrying means and moving said food-carrying means through said heating chamber.

2. Apparatus according to claim 1 further comprising a first conveyor belt for feeding said food-carrying means to the intake end of said endless conveyor, and
a second conveyor belt for receiving said food-carrying means discharged from the discharge end of said endless conveyor.

3. Apparatus according to claim 2 further comprising means defining a tunnel adjacent the discharge end of the heating chamber, said second conveyor belt extending through said tunnel.

4. Apparatus according to claim 1, wherein said device further comprises
base-frame means, said base frame means mounting said sub-chamber and said conveyor.

5. In food processing apparatus
a tunnel oven having an inlet and outlet, said oven comprising
a plurality of aligned separable sub-chambers, each said sub-chamber including
a pair of opposed side walls,
an upper wall extending between the side walls,
upper baffle means mounted beneath the upper wall, side baffle means mounted adjacent each of said side walls, said upper and side baffle means defining a passage for food-carrying means,
electrically-driven fan means located adjacent the upper baffle means and operative to circulate air along symmetrical closed paths within the sub-chamber between the baffle means and walls and thru the passage, and
electric heater means arranged on said paths to heat air circulated by the fan means, and
endless conveying means extending from the inlet to the outlet of said oven and lying adjacent the bottom of said passages, said endless conveying means including
flights, said flights engaging the food-carrying means and moving same continuously thru said passages.

* * * * *